United States Patent [19]

Schulz

[11] Patent Number: 5,464,363
[45] Date of Patent: Nov. 7, 1995

[54] POLISHING STACK FOR THERMOPLASTIC FILMS OR SHEETS

[75] Inventor: Reinhard Schulz, Hanover, Germany

[73] Assignee: Hermann Berstorff Maschinenbau GmbH, Hanover, Germany

[21] Appl. No.: 192,602

[22] Filed: Feb. 7, 1994

[30] Foreign Application Priority Data

Feb. 18, 1993 [DE] Germany .......................... 43 04 918.4

[51] Int. Cl.[6] .................................................. B24B 9/00
[52] U.S. Cl. ...................... 451/190; 451/188; 451/183; 451/207; 451/110
[58] Field of Search .................................. 451/190, 194, 451/183, 188, 207, 907, 109, 110, 130, 131, 132, 342, 343, 541

[56] References Cited

U.S. PATENT DOCUMENTS 2,267,521  12/1941  Griffin ........................... 451/207
4,183,181  1/1980   Kitazawa ........................ 451/190
5,312,569  5/1994   Mezei ........................... 451/188

FOREIGN PATENT DOCUMENTS 3702945  8/1988  Germany .

*Primary Examiner*—Bruce M. Kisliuk
*Assistant Examiner*—Eileen P. Morgan
*Attorney, Agent, or Firm*—Foley & Lardner

[57] ABSTRACT

The invention relates to a polishing stack with at least one fixed and one moveable polishing roll for polishing a plastic sheet leaving a wide extrusion die. A device is provided that preloads the frames and the bearings and acts on a roll gap adjusting device which includes a pinion gear arrangement and drive for finely adjusting the roll gap between the fixed and moveable rolls. The polishing stack in preferred form includes a center fixed roll and top and bottom adjustable rolls.

4 Claims, 5 Drawing Sheets

POLISHING STACK FOR THERMOPLASTIC FILMS OR SHEETS

BACKGROUND OF THE INVENTION

The present invention relates to a polishing stack for polishing a plastic sheet produced in a wide extrusion die, wherein the stack is comprised of at least two polishing rolls supported in frames and equipped with adjusting devices for the roll thickness.

A plastic sheet produced by means of a wide extrusion die generally passes two or more polishing gaps. In this case, the term plastic sheet refers to the still plastified sheet leaving the die as well as to the subsequently formed plastic film. Plastic sheets or films polished with a device of the described type are applied in particular for thermoforming purposes, e.g. in the packing industry.

A polishing stack of this kind is disclosed in DE 37 02 945 A1, which, however, is not provided with a gap adjustment.

The task of the present invention is to present a polishing stack for thermoplastic films that is distinguished by a complete compensation of all roll bearing and frame clearances and an extremely precise adjustment of the gap thickness.

The paramount aim is to eliminate the bearing clearances, to adjust the thickness of the gaps between the rolls, and to generate a roll bending force at minimum machine costs.

SUMMARY OF THE INVENTION

The task is solved by providing a polishing stack comprising at least two polishing rolls supported in frames and adjustable for roll thickness, in which the roll bearings and the frame are preloaded and a separate adjusting device is provided for adjusting the roll gap thickness.

A device for the compensation of the frame and bearing clearances is provided which is combined with the adjusting device for the gap thickness and allows at the same time the exertion of a roll bending force to compensate for the roll deflection.

Owing to the fact that the internal bearing elements of a roll are fixed, e.g. welded to the frame, and both internal bearing elements of the top or bottom roll are supported by levers that can be preloaded by means of hydraulic cylinders, the top or bottom roll can be approached to the fixed bearing elements of the center roll by generating a preloading force. The bearing clearances of all bearings are thus compensated, and a roll bending force is generated that counteracts the gap forces caused by the material to be calibrated.

The device for the gap thickness adjustment is suspended at external bearings arranged on the roll journals, with the housing of the gear unit for the gap thickness adjustment being arranged at the top or bottom side of the bearing elements of the external bearings. By means of the gear unit, the distance between the individual rolls is adjusted via two tappets that are guided through the bearing elements.

BRIEF DESCRIPTION OF THE DRAWINGS

The invention is explained in detail in particular reference to the application drawings in which.

DETAILED DESCRIPTION OF THE PREFERRED EMBODIMENTS

Figure 1:
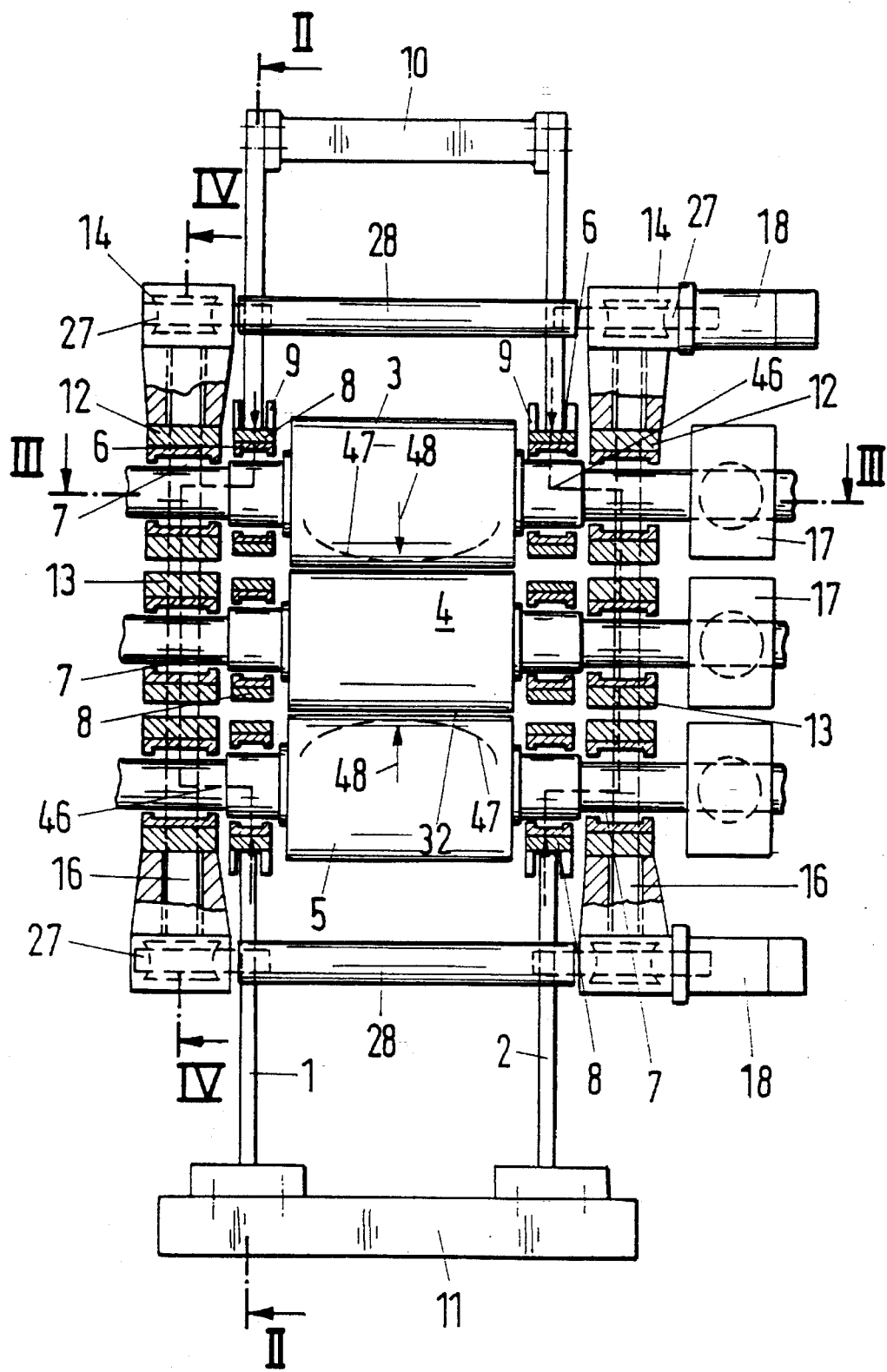
FIG. 1 is a front view of a polishing calendar according to the invention.

FIG. 1 shows the polishing calender according to the invention, with two frames 1 and 2 being arranged on a base plate 11. The frames 1 and 2 are connected at the top by means of a cross beam 10, and each frame supports an upper and a lower swivelling arm 9 as clearly shown in FIG. 2. An upper roll 3 is arranged in bearing blocks 8 and main bearings 6 at one end of the upper swivelling arm 9, and a lower roll 5 is arranged in bearing blocks 8 and in main bearings 6 on the lower swiveling arm 9.

The center roll 4 is a fixed roll which is supported in the main bearings 6 of the bearing elements 8a that are welded to both frames.

Figure 2:
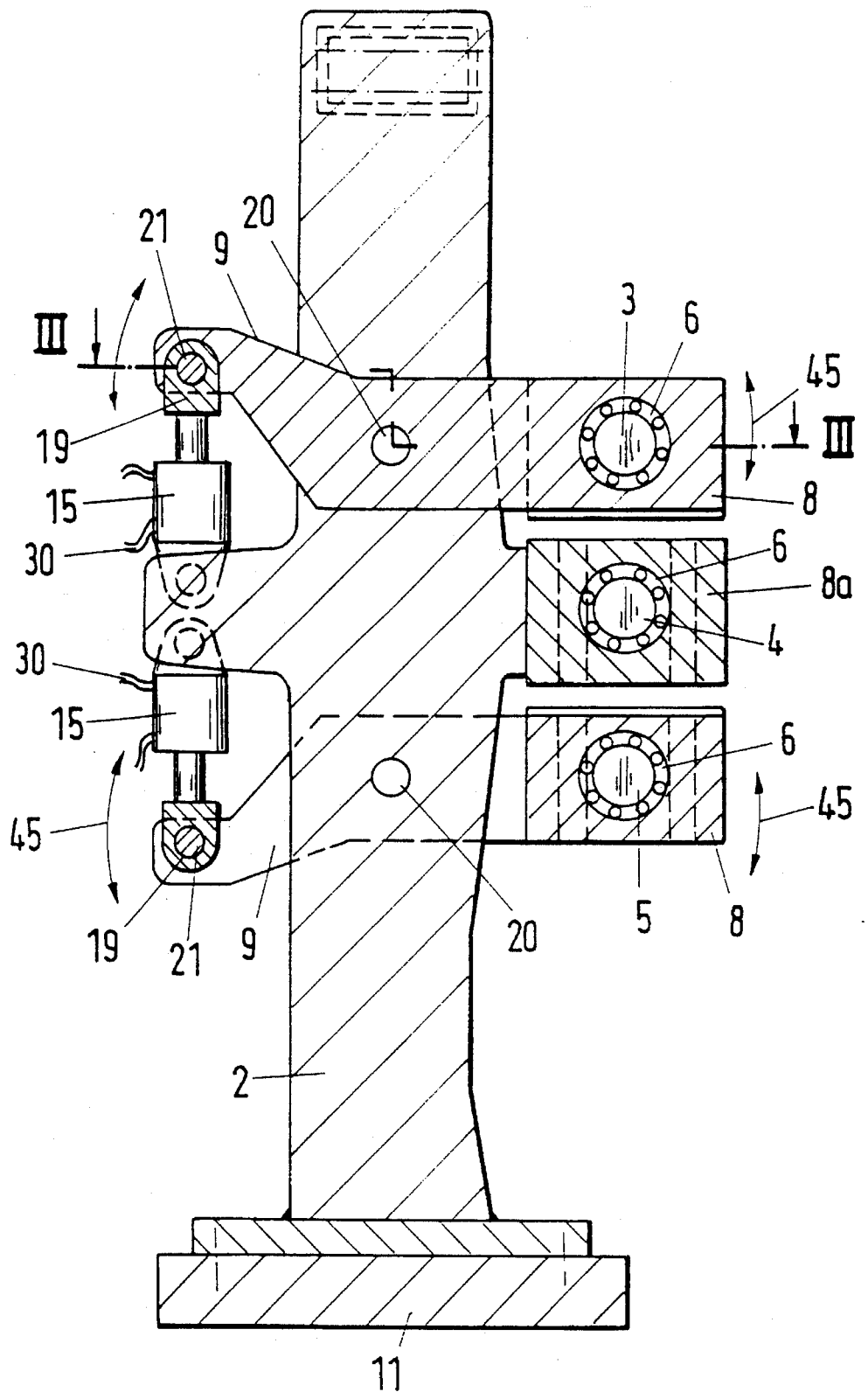
FIG. 2 is a cross sectional view taken on line II—II on FIG. 1.
Figure 3:
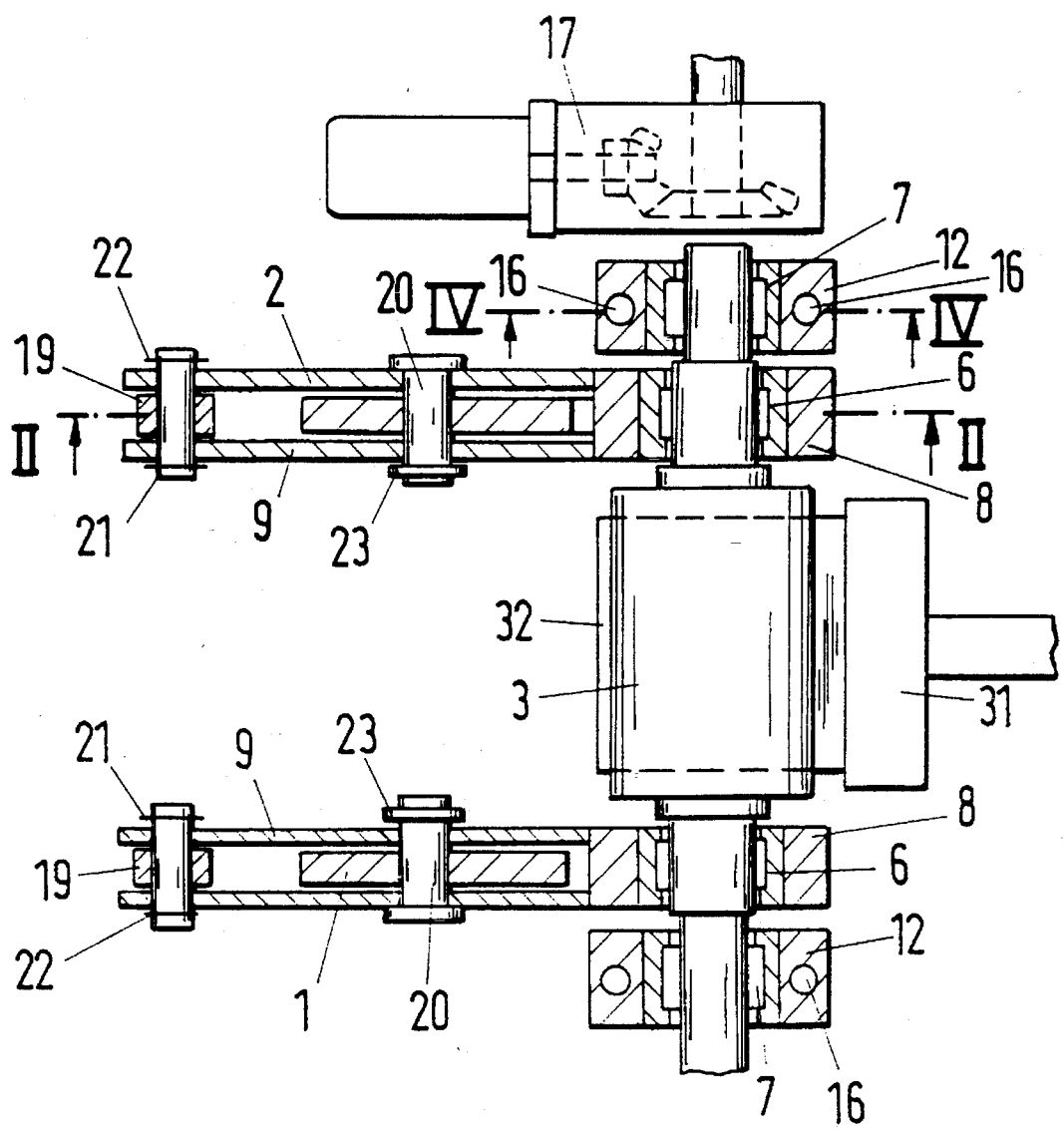
FIG. 3 is a horizontal sectional view taken on lines III—III in FIG. 1 and 2.

By means of the upper and the lower swivelling arms or levers 9, each of the top and bottom rolls 3 and 5 can be pivoted around a pivot in the form of bearing bolt 20. Pivotal movement is effected by hydraulic cylinders 15 that are fixed by means of bolts 21 to the levers 9, with the cylinders 15 being actuated by pressure agent supply lines 30. The bolts 20 and 21 are provided with locking rings 22 and 23 (FIG. 3). The swivelling motion is carried out in the direction indicated by the arrows 45 (FIG. 2).

By moving the top and bottom rolls 3 and 5 by means of the hydraulic cylinders 15, the frame is preloaded, and the bearing clearance in the main bearings 6 and the supporting bearings 7 is compensated, provided that different approaching forces are exerted in order to avoid the individual approaching forces counterbalancing each other. Rolls 3, 4, and 5 are driven by the drive units 17.

By means of polishing calenders of this type, plastic films or sheets formed by means of a wide extrusion die 31 (FIG. 4), for instance, are polished in the gap between rolls 4 and 5, and their thickness is calibrated, which requires an extremely precise adjustment of the gap thickness.

Extremely high approaching pressures are to be evenly applied over the entire face width of the roll. For such an adjustment, the bearing clearance of the roll bearings as well as the roll deflection and the bending moment of the frames are to be taken into consideration. The gap loads resulting in the roll gaps reach values of up to 800 N/cm, for instance. The thickness tolerances of the plastic films produced may amount to maximum +/−10 my in case of a film thickness of 600 my, for example.

In order to achieve this objective, the polishing calender is provided with the following devices. Supporting bearings 7 are arranged in bearing elements 12 (FIG. 4) on both sides of the roll journals of rolls 3, 4, and 5, with the roll journals projecting from the main bearings 6 to the outside.

The bearing elements 12 are formed with two vertical and parallel bores, through which tappets 16 are guided, arranged on both sides of the bearings.

One end of each tappet 16 is of square design 29 and firmly fixed in a corresponding recess in the center bearing element 13. The other end of the tappets is provided with a fine-pitch thread that is combined with a fine-pitch thread of the worm gears 25. The worm gears 25 are arranged in the worm wheel bearings 24.

The worms 27 of the top and bottom gear units 14 are linked by means of connecting shafts 28 (FIG. 1) in order to obtain a synchronous run set in rotation by means of the drive unit 18.

Figure 4:
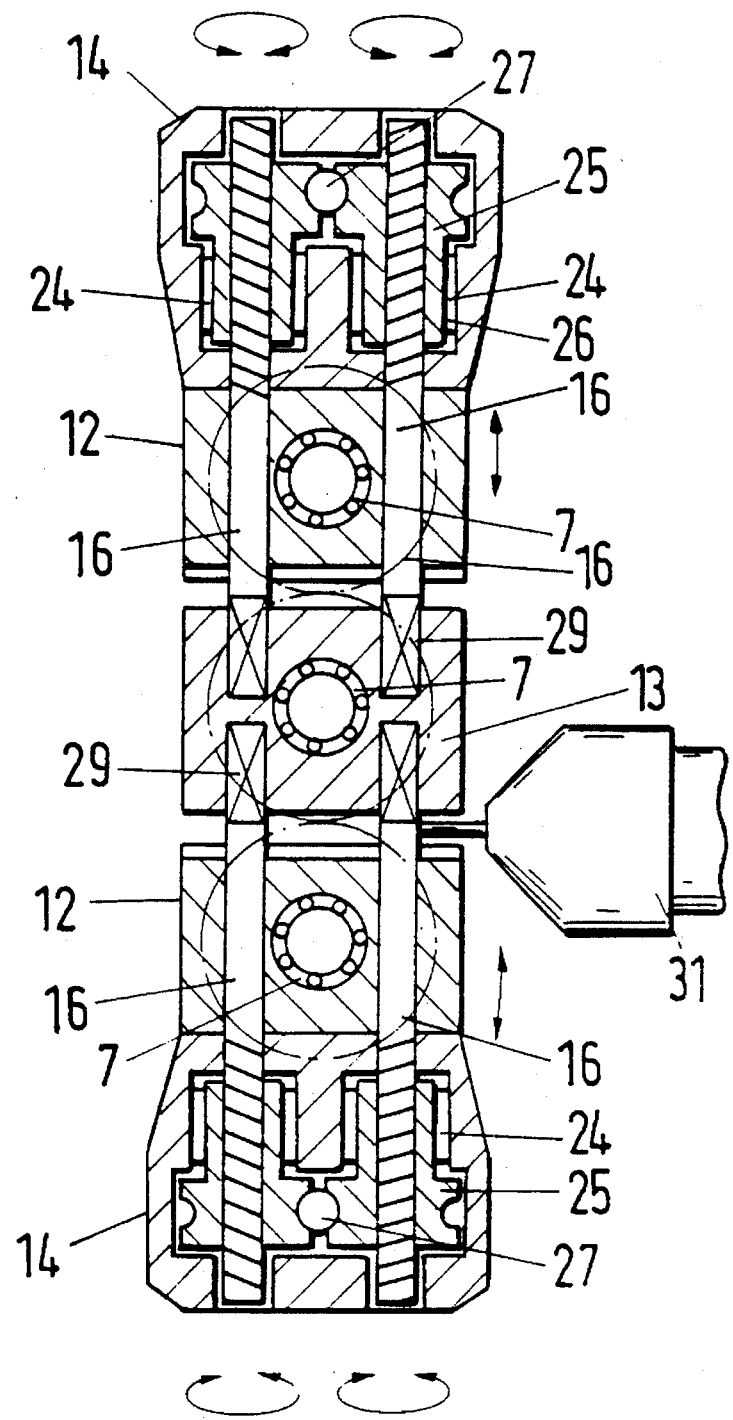
FIG. 4 a vertical cross sectional view taken on line IV—IV in FIG. 1.

By means of this adjusting device, which is clearly shown in FIG. 4, the gap thickness between rolls 3 and 4 as well as between rolls 4 and 5 is adjusted as follows. By switching on the drive unit 18 shown at the top of FIG. 1, the worms 27 are rotated on the sychronizing shaft 28 so that the worm gears 25 are also set in rotation. Since the square ends of the tappets 16 are firmly fixed in the center bearing element 13, the bearing elements 12 fixed at the gear unit housings 14 are lifted or, when changing the sense of rotation, lowered synchronously on both sides of the top roll 3 or the bottom roll 5 (FIG. 1).

Since the top and the bottom rolls are supported by the bearing elements 12, the gap thickness between rolls 3 and 4 as well as between rolls 4 and 5 is thus adjusted.

When the roll gap thickness has been adjusted, the frame and bearing clearances are compensated as follows. The hydraulic cylinders 15 are pressurized, and the main bearings 6 and bearing elements are thus approached by the upper and lower levers 9. The extent of the approaching motion, i.e. the approaching force, can be selected via the pressure in the hydraulic cylinders which can, alternatively, comprise pneumatic cylinders.

The pressurization of the hydraulic cylinders results at the same time in a preloading of the frames.

As already mentioned, the force applied at the upper hydraulic cylinder should differ from the force applied to the lower hydraulic cylinder, since the force of the upper cylinder would otherwise be counterbalanced by that of the lower cylinder, and the bearing clearance in the bearings 6, 7 of roll 4 would not be compensated.

The course of the force is illustrated by means of FIG. 1 and described as follows. Upon actuation of the hydraulic cylinders 15, the levers 9 are driven around their pivot 20 via the bolts 21, so that the bearing elements 8 and the internal bearings 6 are pressed downwards or upwards (arrow 45 in FIG. 2). The force that is thus generated propagates (dotted line 46) via the roll journals towards the outside to the external bearings 7, the bearing elements 13, and the roll journals of the center roll. The bottom roll 5 and/or the top roll 3 are thus subjected to a slight bending within the tolerances noted above, which is being represented by the dotted line 47 and the arrows 48. This minor bending force of the rolls counteracts the roll deflection force resulting from the calibration of the plastic material between the rolls so that the roll shells are relatively parallel.

By means of the device according to the invention, it is thus possible to obtain with a single device an exact adjustment of all roll gaps, a compensation of the bearing clearances of all internal and external bearings, and the generation of a bending effect for the rolls which counteracts the roll deflection caused by the material to be calibrated in the roll gap.

When using a polishing calender with only two rolls, the bearing element of the bottom or the top roll is designed as the fixed bearing. The course of the force regarding the bottom roll and/or the bearing elements is thus analogous, as indicated by the dotted line for the course of the force 46.

Figure 5:
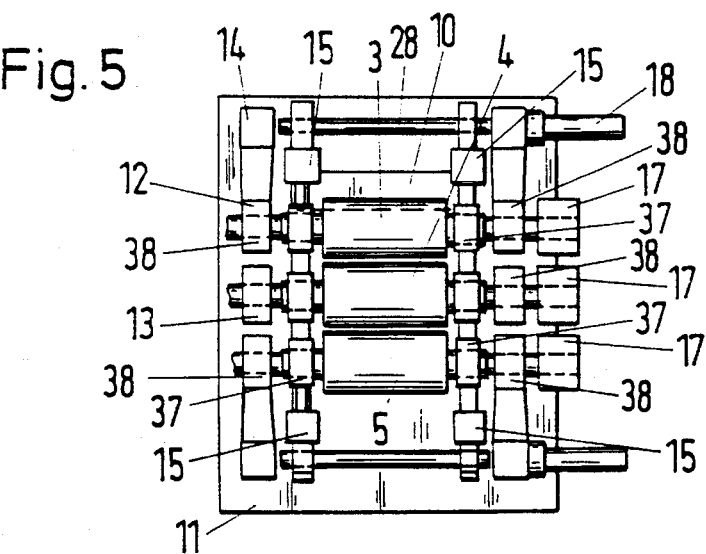
FIG. 5 is a top plan view of the polishing stack shown in FIG. 6, taken on line V—V in FIG. 6.
Figure 6:
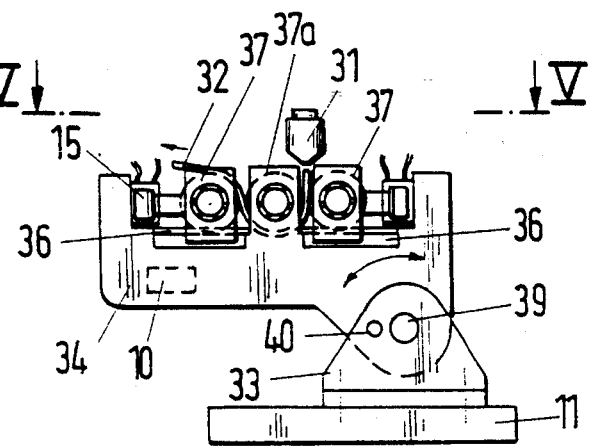
FIG. 6 is a side view of a horizontally arranged polishing stack.

The horizontally arranged polishing stack shown in FIGS. 5 and 6 comprises a U-shaped frame 34 with hydraulic cylinders 15 acting on the bearing elements 37. The gap thickness adjusting device is the same as shown in FIG. 4, and the bearing elements 37 have the same function as the supporting bearing elements 12 shown in FIG. 4.

Figure 7:
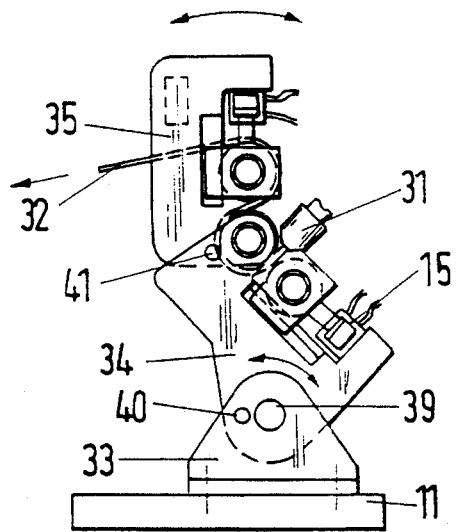
FIG. 7 is a side view of a polishing stack of bent design.

FIG. 7 shows a bent version of the polishing stack, with elements previously illustrated and described being arranged in a similar manner.

What is claimed is:

1. A polishing roll stack for polishing a plastic sheet formed in an extrusion die, comprising:

a pair of spaced adjustable polishing rolls and an intermediate fixed center polishing roll, each having a roll journal at each end thereof, said rolls defining therebetween roll gaps between which the sheet passes;

spaced frames for supporting the rolls;

said fixed polishing roll being supported in fixed main bearing and supporting bearings mounted in bearing elements at each end of said polishing roll, and said adjustable polishing rolls being supported in movable main bearings and supporting bearings mounted in bearing elements at each end of said supporting rolls, said supporting rolls in each instance being disposed outwardly of said fixed bearings;

a preloading device mounted on said frames for preloading said main bearings and said supporting bearings for said adjustable polishing rolls, and an adjusting device for each adjustable polishing roll, said adjusting device being partially mounted in said bearing elements, and means to operate said adjusting device for moving the adjustable rolls toward or away from the fixed roll thereby to adjust the thickness of the roll gaps.

2. The polishing roll stack as recited in claim 1, wherein said preloading device comprises a pair of swivelling levers each of which is pivotally connected to said frames and operatively connected to said bearing elements for said adjustable rolls, and means for swivelling said levers to move said adjustable rolls toward or away from said fixed roll.

3. The polishing roll stack as recited in claim 1, wherein said preloading device comprises swiveling arms fixed at a first end to the bearing elements of the main bearings for said adjustable polishing rolls and pivotally connected to said frames, and hydraulic cylinders supported by the frames and operatively connected to second, opposite ends of said swivelling arms whereby actuation of said cylinders effects movement of said arms and consequently movement of said bearing elements for said adjustable polishing rolls.

4. The polishing roll stack as recited in claim 1, wherein each of said bearing elements for said adjustable rolls are formed with a pair of bores extending entirely through said bearing elements on either side of said supporting bearings, wherein said bearing elements for said fixed roll are formed with pairs of closed end bores on either side of said fixed supporting bearings, said closed end bores being aligned with said bores formed in said bearing elements mounting said adjustable polishing rolls, and wherein said adjusting device for adjusting the thickness of the roll gaps between the adjustable rolls and the fixed roll comprises tappet members extending through said bores of said bearing elements for said adjustable rolls, said tappet members having shafts with threaded ends and being firmly fixed at one end thereof in the bearing elements of said fixed roll, said tappet members having opposite, other ends formed with a fine-pitch thread, worm gears mounted outwardly of said bearing elements supporting said adjustable rolls, said worm gears being formed with fine-pitch threaded openings threadedly engaged by the threaded ends of said tappet worm shafts, a synchronizing connecting shaft operatively connected to said worm shafts, and adjusting motors operatively connected to said synchronizing connecting shafts for moving said worm gears and thus said bearing elements fixed to said adjustable rolls toward or away from said fixed center roll for adjusting the gaps between said adjustable rolls and said center roll.

* * * * *